(12) United States Patent
Yamada

(10) Patent No.: US 11,599,970 B2
(45) Date of Patent: Mar. 7, 2023

(54) IMAGE DISPLAY METHOD, IMAGE DISPLAY DEVICE, AND NON-TRANSITORY COMPUTER-READABLE STORAGE MEDIUM STORING IMAGE DISPLAY PROGRAM FOR DISPLAYING A PLURALITY OF IMAGES

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/389,826

(22) Filed: Jul. 30, 2021

(65) Prior Publication Data

US 2022/0036504 A1 Feb. 3, 2022

(30) Foreign Application Priority Data

Jul. 31, 2020 (JP) .............................. JP2020-130909

(51) Int. Cl.
| | |
|---|---|
| *G06T 3/20* | (2006.01) |
| *G06F 3/0482* | (2013.01) |
| *G06T 3/40* | (2006.01) |
| *G06T 13/80* | (2011.01) |
| *G06F 3/04883* | (2022.01) |

(52) U.S. Cl.
CPC .............. *G06T 3/20* (2013.01); *G06F 3/0482* (2013.01); *G06F 3/04883* (2013.01); *G06T 3/40* (2013.01); *G06T 13/80* (2013.01); *G06T 2200/24* (2013.01)

(58) Field of Classification Search
CPC .. G06T 3/20; G06T 3/40; G06T 13/80; G06T 2200/24; G06F 3/0482; G06F 3/04883
See application file for complete search history.

(56) References Cited

U.S. PATENT DOCUMENTS

| | | | |
|---|---|---|---|
| 7,581,186 B2 * | 8/2009 | Dowdy | .................... G06F 16/68 |
| | | | 715/727 |
| 2006/0268100 A1 * | 11/2006 | Karukka | ........... H04M 1/72469 |
| | | | 348/14.01 |

(Continued)

FOREIGN PATENT DOCUMENTS

| | | |
|---|---|---|
| JP | 2011-221586 | 11/2011 |
| JP | 2012-238223 | 12/2012 |

(Continued)

*Primary Examiner* — Michelle L Sams
(74) *Attorney, Agent, or Firm* — Workman Nydegger

(57) ABSTRACT

An image display method for a terminal device that includes a display section having an input section includes displaying a plurality of images including a first image, a second image adjacent to the first image, and a third image adjacent to the second image along a predetermined axis, receiving selection of the first image based on touch input, performing, when a first movement instruction to move the first image to a gap between the second image and the third image is received, display in a first display form indicating that the first image has been moved to the gap between the second image and the third image, and performing, when a second movement instruction to move the first image to a position different from the gap between the second image and the third image is received, display in a second display form different from the first display form.

18 Claims, 8 Drawing Sheets

(56) References Cited

U.S. PATENT DOCUMENTS

| | | | |
|---|---|---|---|
| 2012/0287165 A1* | 11/2012 | Yamada | G06F 3/147 345/672 |
| 2015/0160821 A1* | 6/2015 | Cho | G16H 30/20 715/769 |
| 2018/0136810 A1* | 5/2018 | Martin | G06F 3/04845 |

FOREIGN PATENT DOCUMENTS

| | | |
|---|---|---|
| JP | 2018-081683 | 5/2018 |
| JP | 2018-106597 | 7/2018 |

* cited by examiner

IMAGE DISPLAY METHOD, IMAGE DISPLAY DEVICE, AND NON-TRANSITORY COMPUTER-READABLE STORAGE MEDIUM STORING IMAGE DISPLAY PROGRAM FOR DISPLAYING A PLURALITY OF IMAGES

The present application is based on, and claims priority from JP Application Serial Number 2020-130909, filed Jul. 31, 2020, the disclosure of which is hereby incorporated by reference herein in its entirety.

BACKGROUND

1. Technical Field

The present disclosure relates to an image display method, an image display device, and a non-transitory computer-readable storage medium storing a display control program.

2. Related Art

A mobile terminal device or the like displays a plurality of images on a screen.

In the rearrangement of pages in an image preview described in JP-A-2018-081683, a plurality of thumbnail images in a document are displayed as a linear strip, a predetermined thumbnail image is selected from among the plurality of thumbnail images and is highlighted, displayed, and moved (refer to JP-A-2018-081683).

However, in the technique described in JP-A-2018-081683, the selected thumbnail image is highlighted and displayed before the selected thumbnail image is moved in the document and thus it is easy to determine which thumbnail image is moved. However, it is difficult to intuitively recognize a position to which the thumbnail image has been moved in the document in some cases. Especially, when such an operation as described above is performed in a terminal device that is a mobile terminal or the like and has a small screen, it is very difficult to recognize a position to which a thumbnail image has been moved in some cases.

SUMMARY

To solve the foregoing problems, according to an aspect of the present disclosure, an image display method for a terminal device that includes a display section having an input section that receives touch input includes displaying a plurality of images including a first image, a second image adjacent to the first image, and a third image adjacent to the second image along a predetermined axis on the display section, causing the input section to receive selection of the first image based on the touch input, performing, when a first movement instruction to move the first image to a gap between the second image and the third image is received by the input section, display in a first display form indicating that the first image has been moved to the gap between the second image and the third image, and performing, when a second movement instruction to move the first image to a position different from the gap between the second image and the third image is received by the input section, display in a second display form different from the first display form.

To solve the foregoing problems, according to another aspect of the present disclosure, an image display device includes a display section having an input section that receives touch input, and a display controller that controls display of the display section. The display controller displays a plurality of images including a first image, a second image adjacent to the first image, and a third image adjacent to the second image along a predetermined axis on the display section, and the input section receives selection of the first image based on the touch input. When a first movement instruction to move the first image to a gap between the second image and the third image is received by the input section, the display controller performs display in a first display form indicating that the first image has been moved to the gap between the second image and the third image. When a second movement instruction to move the first image to a position different from the gap between the second image and the third image is received by the input section, the display controller performs display in a second display form different from the first display form.

To solve the foregoing problems, according to still another aspect of the present disclosure, a non-transitory computer-readable storage medium stores a display control program to be executed by a computer that controls display of a terminal device that includes a display section having an input section that receives touch input. The display control program includes causing the computer to display a plurality of images including a first image, a second image adjacent to the first image, and a third image adjacent to the second image along a predetermined axis on the display section, causing the computer to receive selection of the first image by the input section based on the touch input, causing the computer to perform, when a first movement instruction to move the first image to a gap between the second image and the third image is received by the input section, display in a first display form indicating that the first image has been moved to the gap between the second image and the third image, and causing the computer to perform, when a second movement instruction to move the first image to a position different from the gap between the second image and the third image is received by the input section, display in a second display form different from the first display form.

DESCRIPTION OF EXEMPLARY EMBODIMENTS

Hereinafter, an embodiment is described with reference to the drawings.

Figure 1:
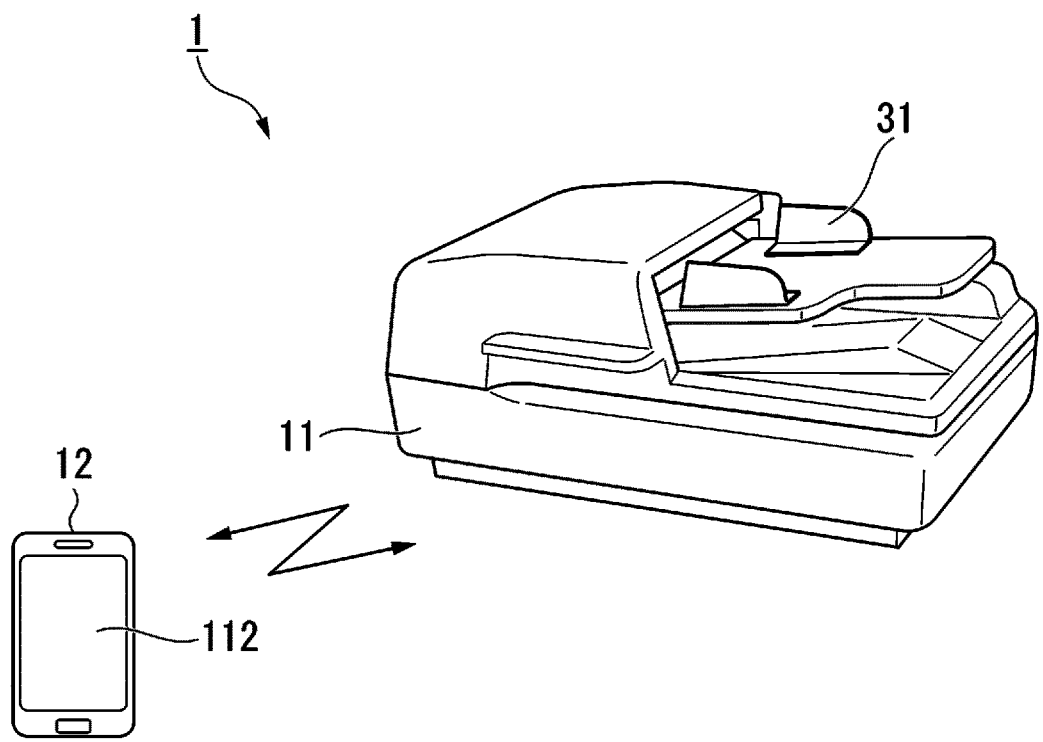
FIG. 1 is a diagram illustrating an example of a schematic configuration of an information processing system.

FIG. 1 is a diagram schematically illustrating an example of a schematic configuration of an information processing system 1 according to the embodiment. The information processing system 1 includes an image processing device 11 and a mobile terminal device 12. The image processing device 11 and the terminal device 12 wirelessly communicate with each other.

The terminal device 12 is a tablet terminal device, a smartphone, or the like and is a portable device that can be carried by a user.

The terminal device 12 includes a display section 112 that is a touch panel having a touch input function. The display section 112 is a display. The terminal device 12 is operated by the user and displays various types of information on the display section 112.

The terminal device 12 communicates with the image processing device 11 to control image processing that is executed by the image processing device 11.

The image processing device 11 is controlled based on an instruction received from the terminal device 12 or the like and executes image processing in accordance with details of the control.

The image processing device 11 has a scanner function. The image processing device 11 reads a plurality of images by the scanner function and wirelessly transmits data of the read images to the terminal device 12. The image processing device 11 includes an auto document feeder 31. The image processing device 11 automatically transports a plurality of paper sheets mounted on the auto document feeder 31 and reads the images on the paper sheets. The paper sheets are of the A4 size, the A3 size, or the like. The number of paper sheets is arbitrary and may be 100 or the like.

The terminal device 12 displays the plurality of images on the display section 112 based on the data received from the image processing device 11 and indicating the plurality of images.

The terminal device 12 receives an instruction based on an operation performed by the user on an image displayed on the display section 112 and executes processing based on the received instruction.

The user can view an image displayed on the display section 112 of the terminal device 12 and view and confirm or edit an image being processed by the image processing device 11.

Figure 2:
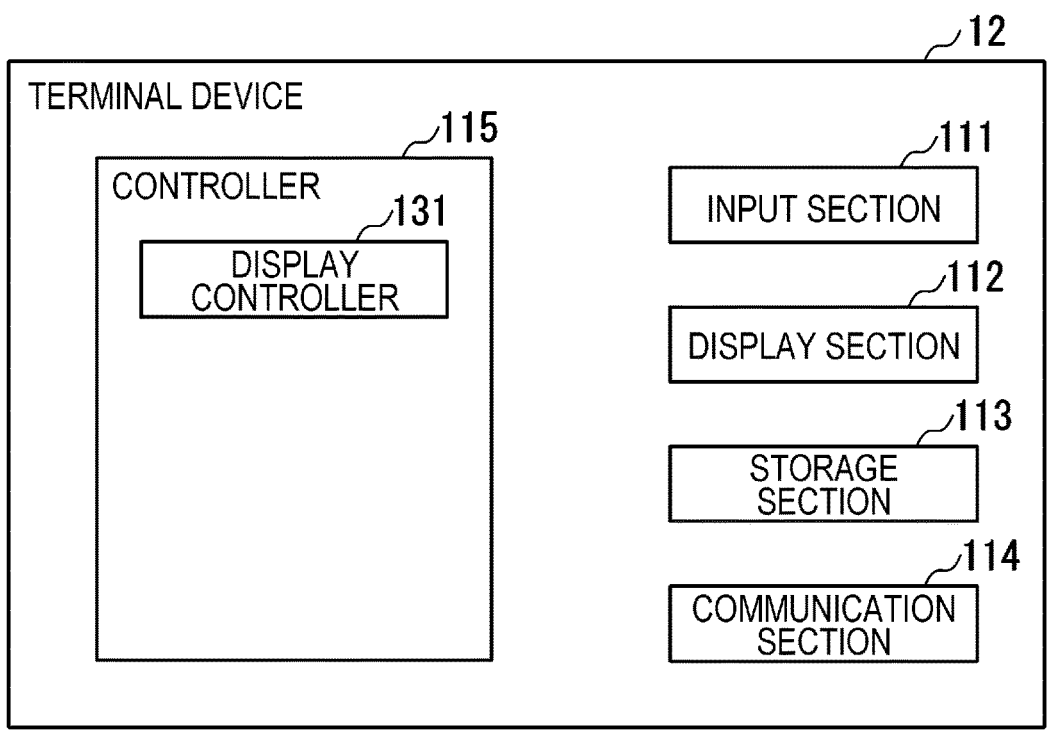
FIG. 2 is a diagram illustrating an example of a configuration of functional blocks of a terminal device.

FIG. 2 is a diagram illustrating an example of a configuration of functional blocks of the terminal device 12 according to the embodiment.

The terminal device 12 includes an input section 111, the display section 112, a storage section 113, a communication section 114, and a controller 115.

The controller 115 includes a display controller 131.

The input section 111 and the display section 112 are constituted by a screen with a touch input function.

The input section 111 inputs details of a touch operation performed by the user on the screen. The input section 111 detects contact of a user's finger or a touch pen and a movement of the user's finger or the touch pen and receives details of an operation based on the results of the detection.

The display section 112 displays various types of information on the screen.

The storage section 113 stores various types of information. The information includes an original image to be displayed and data of a related image generated based on the original image and the like.

The storage section 113 is a memory that includes a read-only memory (ROM) and a random-access memory (RAM).

The communication section 114 wirelessly communicates with the image processing device 11.

The communication section 114 may be referred to as communication circuit, communication port, or communication interface.

The controller 115 executes various types of processing and control. The controller 115 includes a central processing unit (CPU).

The controller 115 includes the display controller 131.

The display controller 131 controls a process of displaying various types of information on the display section 112.

The CPU of the controller 115 executes a control program stored in the storage section 113, thereby executing various types of processing and control.

The control program includes a display control program that controls display. The CPU of the controller 115 executes the display control program stored in the storage section 113, thereby achieving a function of the display controller 131.

The display control program may be an application program dedicated to the image processing device 11. The terminal device 12 may store the display control program in the storage section 113 in advance or may download the display control program and install the display control program therein.

The terminal device 12 includes the display controller 131 in the control section 115, but the function of the display controller 131 that controls display may be configured as a dedicated functional section separated from the controller 115.

The display control to be performed by the terminal device 12 is described below.

The communication section 114 receives data of a plurality of images from the image processing device 11.

The display controller 131 acquires the data of the plurality of images that has been transmitted from the image processing device 11. These images are referred to as original images.

The plurality of images are associated with continuous page numbers in the order in which the images are arranged. The page numbers may be given by the terminal device 12 or by the image processing device 11.

The display controller 131 sets three-dimensional coordinate systems for the respective images. The three-dimensional coordinate systems are referred to as local coordinate systems. The local coordinate systems are three-dimensional Cartesian coordinate systems.

Figure 3:
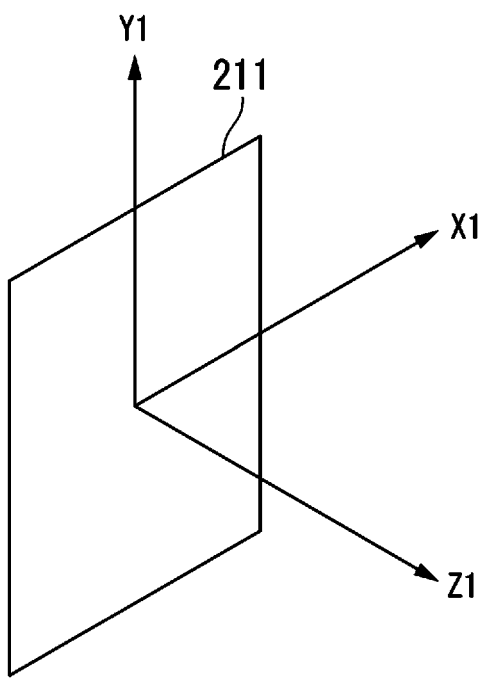
FIG. 3 is a diagram illustrating an example of a local coordinate system of one image.

FIG. 3 is a diagram illustrating an example of a local coordinate system of one image 211 according to the embodiment.

A local coordinate system with an X1 axis, a Y1 axis, and a Z1 axis is set for the image 211.

The local coordinate systems are set for the respective images.

The arrangement of the local coordinate systems for the respective images may be arbitrary.

The display controller 131 adjusts the arrangement of the images using the respective local coordinate systems as references.

The display controller 131 arranges the plurality of images in a three-dimensional coordinate system common to the plurality of images. The common three-dimensional coordinate system is referred to as global coordinate system. The global coordinate system is a three-dimensional Cartesian coordinate system.

The display controller 131 maps, to a two-dimensional coordinate system, an overall image including the plurality of images arranged in the global coordinate system. The display controller 131 treats the result of the mapping as display data. The display data is pixel data. The images of the display data are referred to as thumbnail images. The two-dimensional coordinate system is referred to as display coordinate system. The display coordinate system is a two-dimensional Cartesian coordinate system. A display region of the display data is referred to as view port.

The case where the plurality of images are arranged and displayed in the global coordinate system is described above, but one image may be arranged and displayed in the global coordinate system.

The thumbnail images are obtained by reducing the original images in size.

Figure 4:
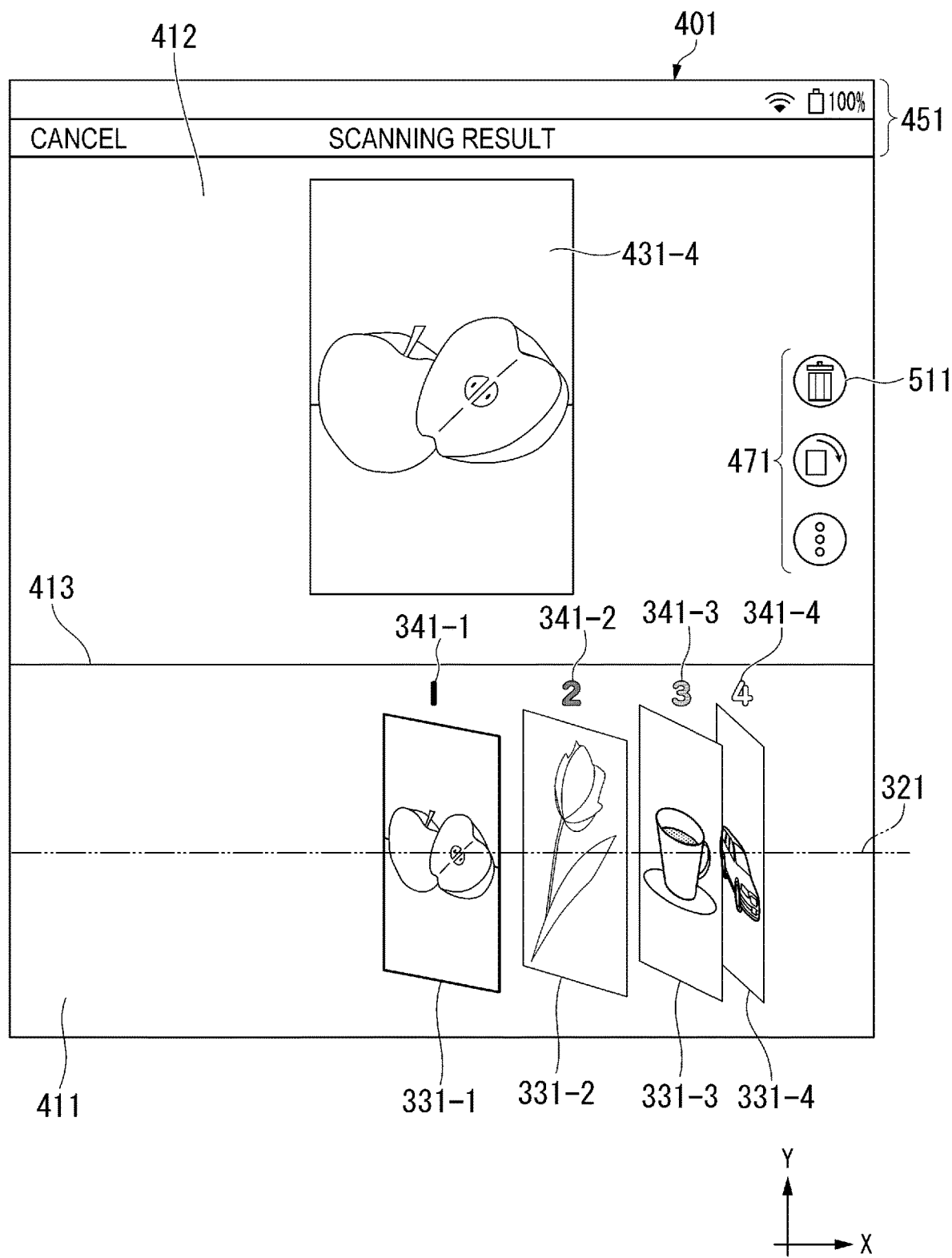
FIG. 4 is a diagram illustrating an example of a first display screen.

FIG. 4 is a diagram illustrating an example of a first display screen 401 according to the embodiment.

FIG. 4 illustrates a display coordinate system with an X axis and a Y axis.

When the screen of the display section 112 of the terminal device 12 is viewed from the front side of the terminal device 12, a positive direction of the X axis is a right direction, a negative direction of the X axis is a left direction, a positive direction of the Y axis is an upward direction, and a negative direction of the Y axis is a downward direction. The arrangement of the display coordinate system with respect to the screen may be arbitrary.

The first display screen 401 is an example of a display screen displayed by the display section 112 of the terminal device 12.

A display region of the first display screen 401 includes a first display region 411, a second display region 412, and a third display region 451. A region that is included in the display region and excludes the third display region 451 is divided into the first display region 411 and the second display region 412.

The display controller 131 displays, in the third region 451, a radio wave state of radio communication and character information such as "Cancel" that can be operated by the user.

The display controller 131 may not display the third display region 451.

The first display region 411 and the second display region 412 are rectangular regions, each of which has sides parallel to the X axis and sides parallel to the Y axis.

In FIG. 4, widths of the sides parallel to the X axis of the first and second display regions 411 and 412 are larger than widths of the sides parallel to the Y axis of the first and second display regions 411 and 412. However, the first and second display regions 411 and 412 are not limited to this.

The first display region 411 is arranged on the negative side of the Y axis with respect to the second display region 412. The second display region 412 is arranged on the positive side of the Y axis with respect to the first display region 411. The widths of the sides parallel to the X axis of the first display region 411 are the same as the widths of the sides parallel to the X axis of the second display region 412. The side of the first display region 411 that is present on the positive side of the Y axis overlaps the side of the second display region 412 that is present on the negative side of the Y axis. Therefore, a rectangular display region is constituted by the first display region 411 and the second display region 412.

The first display screen 401 illustrated in FIG. 4 has, as a boundary axis 413, a boundary line between the first display region 411 and the second display region 412. The boundary axis 413 may not be displayed.

In the first display region 411 illustrated in FIG. 4, a plurality of thumbnail images 331 are arranged along a first axis 321 and displayed. In the first display region 411, the plurality of thumbnail images 331 are arranged in ascending order of page number from the negative side of the X axis to the positive side of the X axis.

The first axis 321 is a virtual axis and is not actually displayed but may be displayed.

In FIG. 4, the first axis 321 is parallel to the X axis and extends through the midpoint, in the Y-axis direction, of the first display region 411.

FIG. 4 illustrates the plurality of images 331 as i-th thumbnail images 331-$i$ in the order of page numbers. In this case, i is an arbitrary integer of 1 or greater and the maximum value P is the number of thumbnail images 331. Thumbnail images that are not related to pages are referred to as thumbnail images 331.

In FIG. 4, the i-th thumbnail images 331-$i$ are rectangular images.

The i-th thumbnail images 331-$i$ may be arranged in such a manner that widths of the i-th thumbnail images 331-$i$ in the Y-axis direction may be larger than widths of the i-th thumbnail images 331-$i$ in the X-axis direction. Alternatively, the i-th thumbnail images 331-$i$ may be oriented toward another direction or the orientation of the i-th thumbnail images 331-$i$ may be changed.

The display controller 131 arranges the i-th thumbnail images 331—along the first axis 321 in the first display region 411 in such a manner that a k-th thumbnail image 331-$k$ of a k-th page that is close to the center of the first display region 411 has an image surface forming a small angle with respect to the display screen and that a k+m-th thumbnail image 331-$k$+m separated from the center of the first display region 411 by a predetermined number m of thumbnail images has an image surface forming a larger angle with respect to the display screen than the angle of the image surface of the k-th thumbnail image 331-$k$. In this case, k is an integer of 1 or greater and P or less and m is an integer smaller than k. The angles formed between the image surfaces and the display screen are angles formed between the Z axis perpendicular to the display screen and Z1 axes of the i-th thumbnail images 331-$i$. The display controller 131 arranges the i-th thumbnail images 331-$i$ along the first axis 321 in the first display region 411 in such a manner that thumbnail images 331 separated from the center of the first display region 411 by a predetermined number of thumbnail images are arranged and displayed with equal gaps between the thumbnail images 331 and the center of the first display region 411.

Portions that are included in the first display region 411 and are the farthest from the center of the first display region 411 in the first axis 321 direction correspond to the left and right sides of the first display region 411.

The plurality of thumbnail images 331 are displayed in such a manner that images of the page numbers associated with the respective thumbnail images 331 are given as additional images to the thumbnail images 331.

FIG. 4 illustrates the images of the page numbers of the i-th thumbnail images 331-$i$ as i-th page number images 341-$i$.

FIG. 4 illustrates the case where the display controller 131 displays four thumbnail images 331 in the first display region 411 in such a manner that gaps between the thumbnail images 331 displayed are different from each other.

In FIG. 4, the first thumbnail image 331-1 of the first page and the first page number image 341-1 are displayed in a region present near the center of the first display region 411 in the first axis 321 direction. In addition, the second to subsequent thumbnail images 331-2 and the like with the page numbers greater than the first page and the second and subsequent page number images 341-2 and the like are displayed in ascending order of page number toward the positive direction of the X axis with respect to the region present near the center of the first display region 411 in the first axis 321 direction. When a page with a page number smaller than a page number displayed in the region present near the center is present, a thumbnail image 331 of the page with the page number smaller than the page number displayed in the region present near the center and the like are displayed in descending order of page number toward the negative direction of the X axis with respect to the region present near the center of the first display region 411 in the first axis 321 direction.

The display controller 131 adjusts the arrangement of the i-th page number images 341-i based on the arrangement of the i-th thumbnail images 331-i with respect to the local coordinate systems of the i-th thumbnail images 331-i. The display controller 131 generates display data for the display coordinate system in such a manner that the display data includes the i-th thumbnail images 331-i and the i-th page number images 341-i.

The display controller 131 arranges and displays the i-th page number images 341-i on the positive side of the Y axis with respect to the i-th thumbnail images 331-i.

The display controller 131 arranges and displays the i-th page number images 341-i in the first display region 411. The display controller 131 arranges and displays the i-th page number images 341-i in such a manner that the i-th page number images 341-i are not moved to the outside of the first display region 411 from the boundary axis 413 that is the boundary line of the first display region 411 on the positive side of the Y axis. In FIG. 4, the boundary line is parallel to the X axis.

The display controller 131 may display the i-th page number images 341-i in such a manner that some or all of the i-th page number images 341-i can be moved to the outside of the first display region 411.

The display controller 131 adjusts gray levels to be used to display the i-th page number images 341-i for each of the pages.

The adjustment of the gray levels may be achieved by adjusting transparency in such a manner that as transparency is reduced, a gray level becomes higher and that as transparency is increased, a gray level becomes lower.

The display controller 131 may change one or more of a shape, size, orientation, gray level, position, color, and the like of each of the i-th page number images 341-i associated with the i-th thumbnail images 331-i, based on a displayed state of the i-th thumbnail images 331-i.

In FIG. 4, the display controller 131 arranges the i-th page number images 341-i associated with the i-th thumbnail images 331-i on the positive side of the Y axis with respect to the i-th thumbnail images 331-i, but is not limited to this. The display controller 131 may arrange the i-th page number images 341-i associated with the i-th thumbnail images 331-i on the negative side of the Y axis with respect to the i-th thumbnail images 331-i, or on the positive side of the X axis with respect to the i-th thumbnail images 331-i, or on the negative side of the X axis with respect to the i-th thumbnail images 331-i.

In FIG. 4, the display controller 131 arranges the i-th page number images 341-i associated with the i-th thumbnail images 331-i outside the i-th thumbnail images 331-i, but is not limited to this. The display controller 131 may arrange the i-th page number images 341-i associated with the i-th thumbnail images 331-i in the i-th thumbnail images 331-i.

FIG. 4 illustrates the case where the sizes of the thumbnail images 331 displayed in the first display region 411 are the same. However, the thumbnail images 331 may include an image of a different size from the other images. In this case, the display controller 131 may display the thumbnail image 331 of the different size in the first display region 411 or perform a process of making equal widths of all the thumbnail images 331 in one of the X-axis direction and the Y-axis direction or making equal widths of all the thumbnail images 331 in one of the X-axis direction and the Y-axis direction and making equal widths of all the thumbnail images 331 in the other of the X-axis direction and the Y-axis direction.

The first axis 321 is a straight line but may be a line excluding a straight line.

As the first axis 321, the following curved line may be used. The curved line is curved toward the positive side of the Y axis as the curved line extends toward the positive side of the X axis from the position of the center of the first display region 411, and is curved toward the positive side of the Y axis as the curved line extends toward the negative side of the X axis from the position of the center of the first display region 411. The first axis 321 may be a line symmetric about the position of the center of the first display region 411 in the X-axis direction in such a manner that a portion of the line on the positive side of the X axis with respect to the position of the center of the first display region 411 and a portion of the line on the negative side of the X axis with respect to the position of the center of the first display region 411 are symmetric about the position of the center of the first display region 411.

The display controller 131 displays, in the second display region 412, an image corresponding to one i-th thumbnail image 331-i among the thumbnail images 331 displayed in the first display region 411. This image displayed in the second display region 412 is referred to as intermediate image. In FIG. 4, a fourth intermediate image 431-4 corresponding to the fourth thumbnail image 331-4 is displayed in the second display region 412. An intermediate image 431 is obtained by enlarging an i-th thumbnail image 331-i corresponding to the i-th intermediate image 431-i. The intermediate image 431 may be obtained by reducing the original image in size, or may have the same size as that of the original image, or may be obtained by enlarging the original image.

The i-th thumbnail image 331-i for which the i-th intermediate image 431-i is to be displayed is in a selected state in the first display region 411 and is arranged in a region present near the center of the first display region 411 in the first axis 321 direction. The selection is performed by an operation by the user on the first display region 411 or the second display region 412.

FIG. 4 illustrates the case where the display controller 131 controls displayed states of the i-th page number images 341-i. However, the displayed states of the i-th page number images 341-i may be the same.

The display controller 131 may not display the i-th page number images 341-i.

When the display controller 131 detects that the user has performed a predetermined operation on the terminal device 12, the display controller 131 executes control to change an image displayed in the second display region 412.

When the display controller 131 detects that the user has performed an operation of swiping an intermediate image 431 displayed in the second display region 412, the display controller 131 displays, in the second display region 412, an intermediate image 431 of a page adjacent to the page of the swiped intermediate image 431.

When the operation is an operation of moving a finger or the like from the positive side of the X axis to the negative side of the X axis, the display controller 131 executes control to display an intermediate image 431 of a page number increased by 1. When the operation is an operation of moving a finger or the like from the negative side of the X axis to the positive side of the X axis, the display controller 131 executes control to display an intermediate image 431 of a page number reduced by 1.

When the display controller 131 detects that the user has performed an operation of touching a thumbnail image 331 excluding an i-th thumbnail image 331-$i$ currently selected from among the plurality of thumbnail images 331 displayed in the first display region 411, the display controller 131 changes the displayed state to a state in which the touched thumbnail image 331 is currently selected, and displays an intermediate image 431 corresponding to the touched thumbnail image 331 in the second display region 412.

In FIG. 4, a predetermined icon group 471 including a delete icon 511 is displayed in the second display region 412 under control by the display controller 131. When an operation of tapping one icon included in the icon group 471 or the like is performed by a user's finger or the like, the display controller 131 receives an instruction based on the operation. The display controller 131 may display an arbitrary icon in either one or both of the first display region 411 and the second display region 412.

When an operation of tapping a predetermined portion of the display section 112 or the like is performed by a user's finger or the like, the display controller 131 may display a predetermined menu on the display section 112. When an operation of tapping a predetermined portion of the menu or the like is performed by a user's finger or the like, the display controller 131 receives an instruction based on the operation.

The replacement of a page of a thumbnail image 331 is described with reference to FIGS. 5 and 6.

Figure 5:
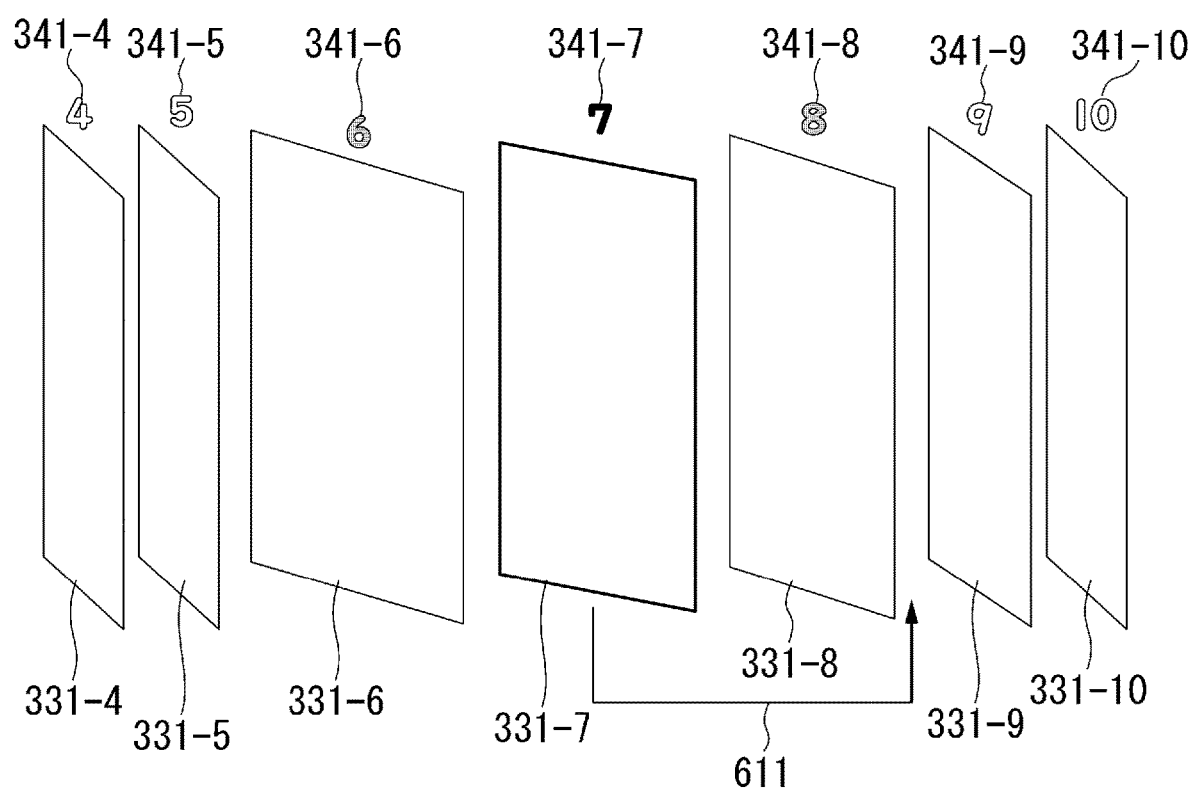
FIG. 5 is a diagram illustrating the replacement of a page of a thumbnail image with a page adjacent to the page of the thumbnail image.

FIG. 5 is a diagram illustrating the replacement of a page of a thumbnail image 331 with a page adjacent to the page of the thumbnail image 331 according to the embodiment.

FIG. 5 illustrates the same display coordinate system as that illustrated in FIG. 4.

FIG. 5 illustrates fourth to tenth thumbnail images 331-4 to 331-10 that are a plurality of thumbnail images 331 displayed in the first display region 411.

In FIG. 5, the seventh thumbnail image 331-7 is positioned near the center with respect to the X axis and selected.

The following describes the case where an operation of tapping the seventh thumbnail image 331-7 and moving the seventh thumbnail image 331-7 to a gap between the eighth thumbnail image 331-8 and the ninth thumbnail image 331-9 is performed by the user with a user's finger or the like.

The display controller 131 receives a first movement instruction 611 based on the operation. The display controller 131 executes a process of moving the seventh thumbnail image 331-7 to the gap between the eighth thumbnail image 331-8 and the ninth thumbnail image 331-9. This process changes the original seventh thumbnail image 331-7 to an eighth thumbnail image 331-8 of the eighth page and changes the original eighth thumbnail image 331-8 to a seventh thumbnail image 331-7 of the seventh page.

FIG. 5 schematically illustrates the first movement instruction 611. The first movement instruction 611 may not be displayed.

Figure 6:
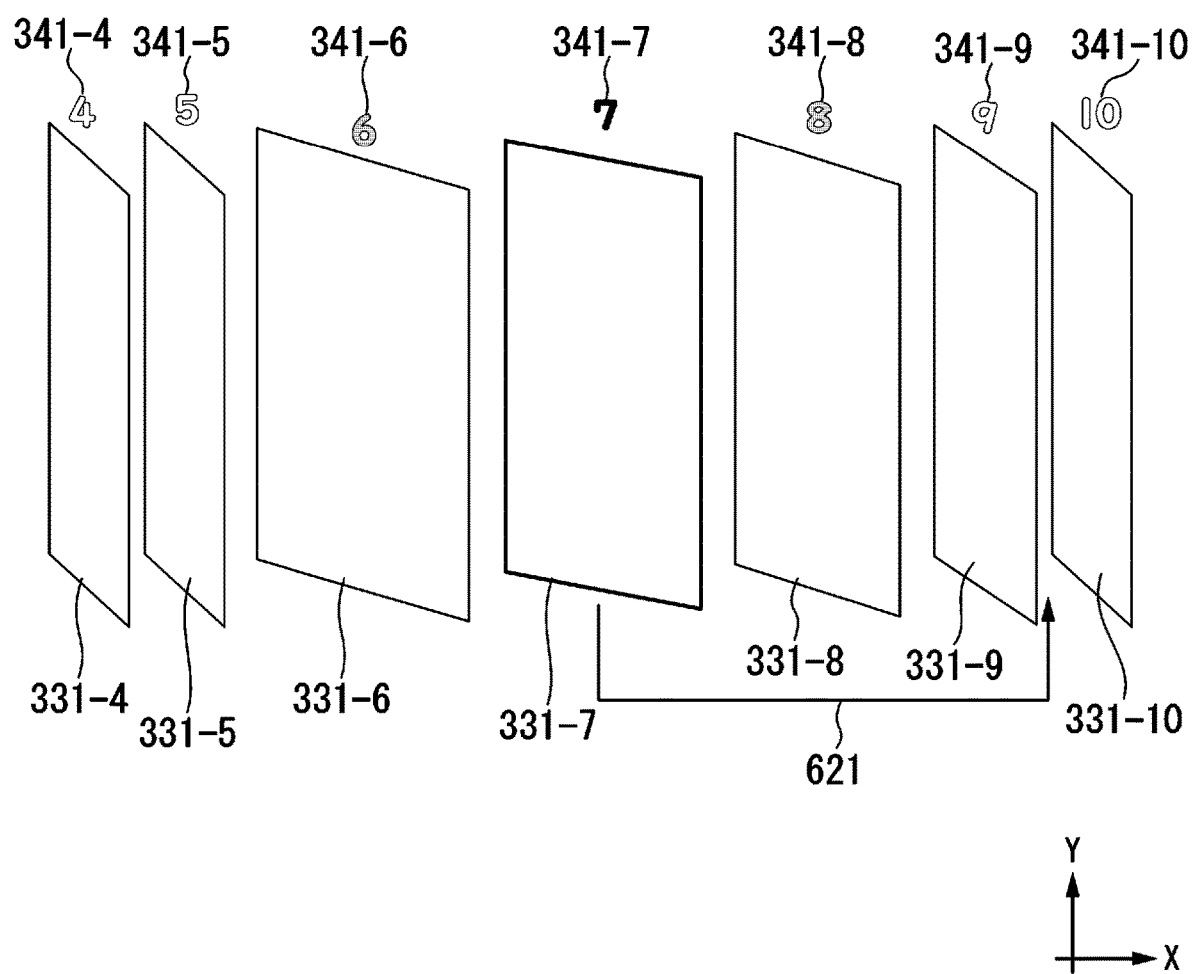
FIG. 6 is a diagram illustrating the replacement of a page of a thumbnail image with a page excluding a page adjacent to the page of the thumbnail image.

FIG. 6 is a diagram the replacement of a page of a thumbnail image 331 with a page excluding a page adjacent to the page of the thumbnail image 331.

FIG. 6 illustrates the same display coordinate system as that illustrated in FIG. 4.

FIG. 6 illustrates the fourth to tenth thumbnail images 331-4 to 331-10 that are a plurality of thumbnail images 331 displayed in the first display region 411.

In FIG. 6, the seventh thumbnail image 331-7 is positioned near the center with respect to the X axis and selected.

The following describes the case where an operation of tapping the seventh thumbnail image 331-7 and moving the seventh thumbnail image 331-7 to a gap between the ninth thumbnail image 331-9 and the tenth thumbnail image 331-10 is performed by the user with a user's finger or the like.

The display controller 131 receives a second movement instruction 621 based on the operation. The display controller 131 executes a process of moving the seventh thumbnail image 331-7 to the gap between the ninth thumbnail image 331-9 and the tenth thumbnail image 331-10. This process changes the original seventh thumbnail image 331-7 to a ninth thumbnail image 331-9 of the ninth page, changes the original eighth thumbnail image 331-8 to a seventh thumbnail image 331-7 of the seventh page, and changes the original ninth thumbnail image 331-9 to an eighth thumbnail image 331-8 of the eighth page.

FIG. 6 schematically illustrates the second movement instruction 621. The second movement instruction 621 may not be displayed.

As the page replacement operations, arbitrary operations may be used.

When a thumbnail image 331 of a page to be replaced is long-pressed by a user's finger or the like, the display controller 131 may enable the thumbnail image 331 to move in the X-axis direction, and an operation of dragging the thumbnail image 331 in a state in which the thumbnail image 331 is long-pressed by the user's finger or the like may be used as a page replacement operation.

When page replacement occurs, the display controller 131 uses an intermediate image 431 displayed in the second display region 412 to display a predetermined animation in the second display region 412.

An animation is display in which the initial display content of the animation and the last display content of the animation are defined and in which the initial to last display contents of the animation are changed at predetermined time intervals or the like.

The display controller 131 displays, as predetermined animations, animations different for page replacement with an adjacent page and page replacement with a page excluding an adjacent page.

As these animations, arbitrary animations may be used.

When page replacement with an adjacent page occurs, the display controller 131 may control display of an animation in which an image to be replaced is moved from a position before the page replacement to a position after the page replacement in the second display region 412 from a state in which such a plurality of images as illustrated in FIG. 5 are displayed.

Similarly, when page replacement with a page excluding an adjacent page occurs, the display controller 131 may control display of an animation in which an image to be replaced is moved from a position before the page replacement to a position after the page replacement in the second display region 412 from a state in which such a plurality of images as illustrated in FIG. 6 are displayed.

The display controller 131 may make the speed of either an animation for page replacement with an adjacent page or an animation for page replacement with a page excluding an adjacent page higher than the speed of the other animation, or may make either one of the two animations blink and not make the other animation blink, or may make the two animations different.

As another operation, when the display controller 131 receives an instruction to replace a page of a y-th thumbnail image 331-$y$ in a state in which the y-th thumbnail image 331-$y$ different from an x-th thumbnail image 331-$x$ selected in the first display region 411 is selected by a user's finger or the like, the display controller 131 may display, in the second display region 412, an animation different from that used when the display controller 131 receives an instruction to replace a page of the selected x-th thumbnail image 331-$x$. In this case, x and y are different integers of 1 or greater and P or less.

It is assumed that, when a thumbnail image of the third page that is displayed in the first display region 411 is selected and a third intermediate image 431-3 of the third page is displayed in the second display region 412, the user uses a finger or the like to long-press and slide the sixth thumbnail image 331-6 of the sixth page and perform a page replacement operation. In this case, the display controller 131 may display, in the second display region 412, an animation in which the third intermediate image 431-3 of the third page disappears and in which the sixth intermediate image 431-6 of the sixth page appears. When an animation similar to the foregoing animation is executed in another operation, the display controller 131 may make the speeds of the two animations or the like different, for example.

As described using FIGS. 4 to 6, the terminal device 12 includes the display section 112 having the input section 111 that receives touch input. The terminal device 12 displays the plurality of thumbnail images 331 along the first axis 321. When one thumbnail image 331 is selected by touch input and the terminal device 12 receives an instruction to move the image, the terminal device 12 performs display in a display form that indicates the movement and varies depending on whether the movement instruction is an instruction to move the image to an adjacent page or an instruction to move the image to a page excluding an adjacent page.

The terminal device 12 displays the plurality of thumbnail images 331 in the first display region 411 and displays, in the second display region 412, an intermediate image 431 that is an enlarged image corresponding to a selected thumbnail image 331. In this displayed state, when the terminal device 12 receives an instruction to move the selected thumbnail image 331, the terminal device 12 performs display on the intermediate image 431 in a display form indicating the movement.

The terminal device 12 may display the plurality of thumbnail images 331 in such a manner that some of the thumbnail images 331 overlap in a partial region of the first display region 411.

The terminal device 12 uses an animation as a display form indicating a movement. As a display form for the case where an instruction to move an image to a page excluding an adjacent page is received, the terminal device 12 uses an animation different from an animation for the case where an instruction to move an image to an adjacent page is received.

Examples of the animations are described with reference to FIGS. 7 to 9.

Figure 7:
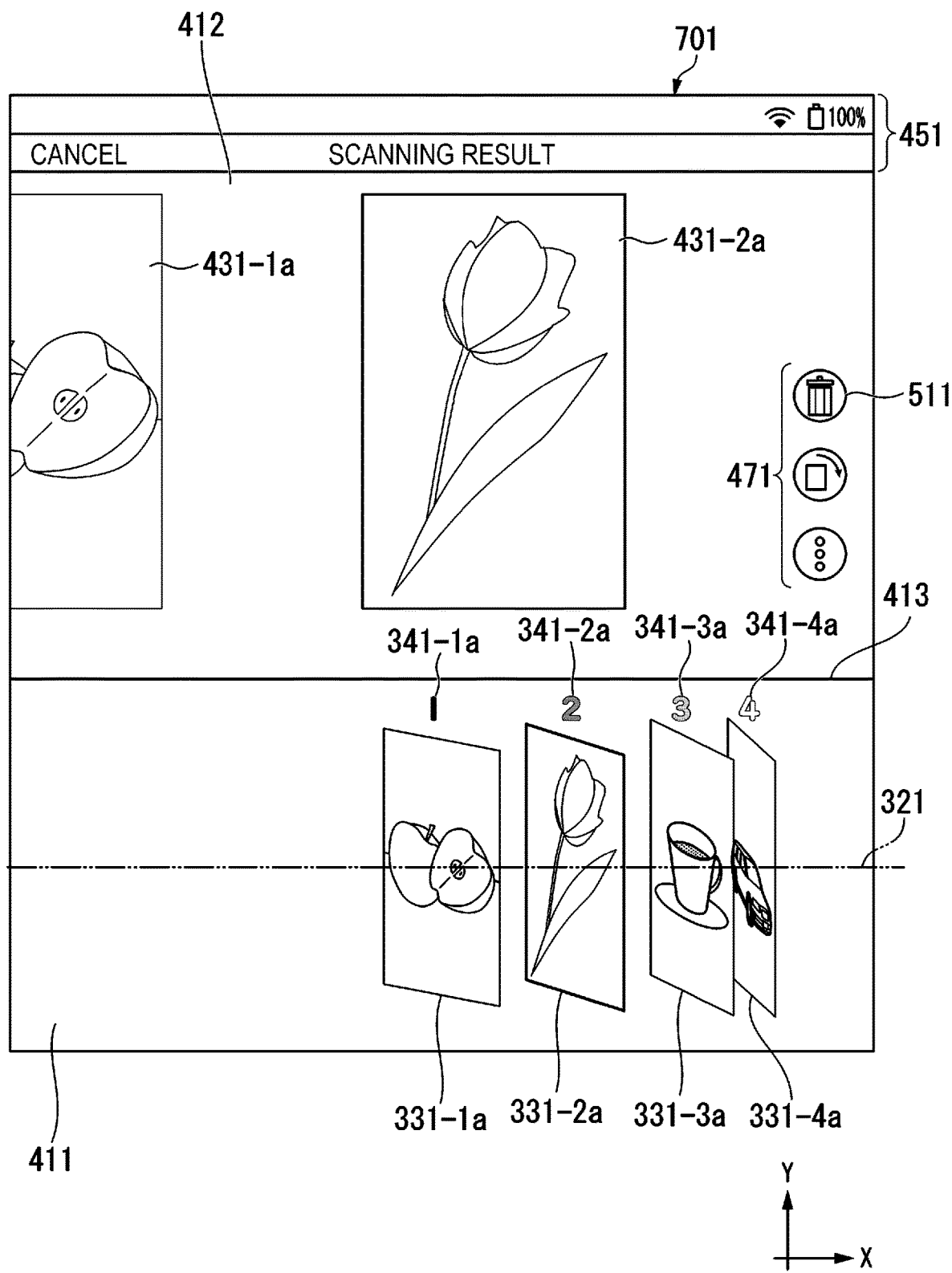
FIG. 7 is a diagram schematically illustrating an image of a first animation on a second display screen.

FIG. 7 is a diagram schematically illustrating an image of a first animation on a second display screen 701 according to the embodiment.

FIG. 7 illustrates the same display coordinate system as that illustrated in FIG. 4.

In FIG. 7, a plurality of 1a-th and subsequent thumbnail images 331-1$a$ and the like and a plurality of 1a-th and subsequent page number images 341-1$a$ and the like are displayed in the first display region 411.

In the display of the first animation, the display controller 131 slides a 1a-th intermediate image 431-1$a$ corresponding to the 1a-th thumbnail image 331-1$a$ of the first page along the X axis, makes the 1a-th intermediate image 431-1$a$ disappear from the second display region 412, slides, along the X axis, a 2a-th intermediate image 431-2$a$ corresponding to the 2a-th thumbnail image 331-2$a$ of the second page adjacent to the page of the 1a-th intermediate image 431-1$a$, and displays the 2a-th intermediate image 431-2$a$ in the second display region 412.

FIG. 7 illustrates the states of the images in the middle of the first animation displayed in the second display region 412.

The first animation is used when the user performs an operation of swiping the 1a-th intermediate image 431-1$a$ displayed in the second display region 412.

In FIG. 7, when the display controller 131 detects that the user has performed an operation of swiping the 1a-th intermediate image 431-1$a$ displayed in the second display region 412 toward the negative side of the X axis, the display controller 131 displays the first animation in which the 1a-th intermediate image 431-1$a$ and the 2a-th intermediate image 431-2$a$ slide toward the negative side of the X axis from the positive side of the X axis. When the operation is an operation of moving a finger or the like toward the negative side of the X axis from the positive side of the X axis, the display controller 131 newly displays an intermediate image 431 of a page with a page number increased by 1. However, when the page of the current intermediate image 431 is the last page, the display controller 131 may not receive the operation or may display a different animation.

On the other hand, when the operation is an operation of moving a finger or the like toward the positive side of the X axis from the negative side of the X axis, the display controller 131 displays an intermediate image 431 of a page with a page number reduced by 1. The display controller 131 displays the first animation in which the current intermediate image 431 and the new intermediate image 431 slide toward the positive side of the X axis from the negative side of the X axis. However, when the page of the current intermediate image 431 is the top page, the display controller 131 may not receive the operation or may display a different animation.

When the display controller 131 detects that the user has tapped an (x+1)a-th thumbnail image 331-($x$+1)a adjacent to an xa-th thumbnail image 331-$xa$ selected in the first display region 411 or an (x−1)a-th thumbnail image 331-($x$−1)a adjacent to the xa-th thumbnail image 331-$xa$ selected in the first display region 411, the display controller 131 controls the display of the first animation in the same manner as the display control that is performed when the swiping operation is detected.

As an animation executed when page replacement with an adjacent page occurs as illustrated in FIG. 5, the display controller 131 may use an animation obtained by reducing the speed of the first animation illustrated in FIG. 7 or an animation obtained by increasing the speed of the first animation illustrated in FIG. 7.

As an animation executed when page replacement with an adjacent page occurs as illustrated in FIG. 5, the display controller 131 may use an animation obtained by making the first animation illustrated in FIG. 7 blink.

As an animation executed when page replacement with an adjacent page occurs as illustrated in FIG. 5, the display controller 131 may use an animation obtained by changing the speed of the first animation illustrated in FIG. 7 and making the first animation illustrated in FIG. 7 blink.

The display controller 131 updates the plurality of thumbnail images 331 to the thumbnail images 331 displayed in the order after the replacement in the first display region 411.

As an animation executed when page replacement with a page excluding an adjacent page occurs as illustrated in FIG. 6 and a page adjacent to a concerned page on the side on which the page excluding the adjacent page is present is in a newly selected state, the display controller 131 may use an animation obtained by either or both of changing the speed of the first animation and making the first animation blink.

As an animation executed when page replacement with a page excluding an adjacent page occurs as illustrated in FIG. 6 and a page selected in advance is in a selected state, the display controller 131 may use an animation obtained by sliding, in the first animation, an intermediate image 431 corresponding to a thumbnail image 331 displayed between the position of the page selected in advance before the movement and the position of the page after the movement and lastly sliding, in the first animation, an intermediate image 431 of the page selected in advance and displaying the intermediate image 431 in the second display region 412.

The display controller 131 updates the plurality of thumbnail images 331 to the thumbnail images 331 displayed in the order after the replacement in the first display region 411.

Figure 8:
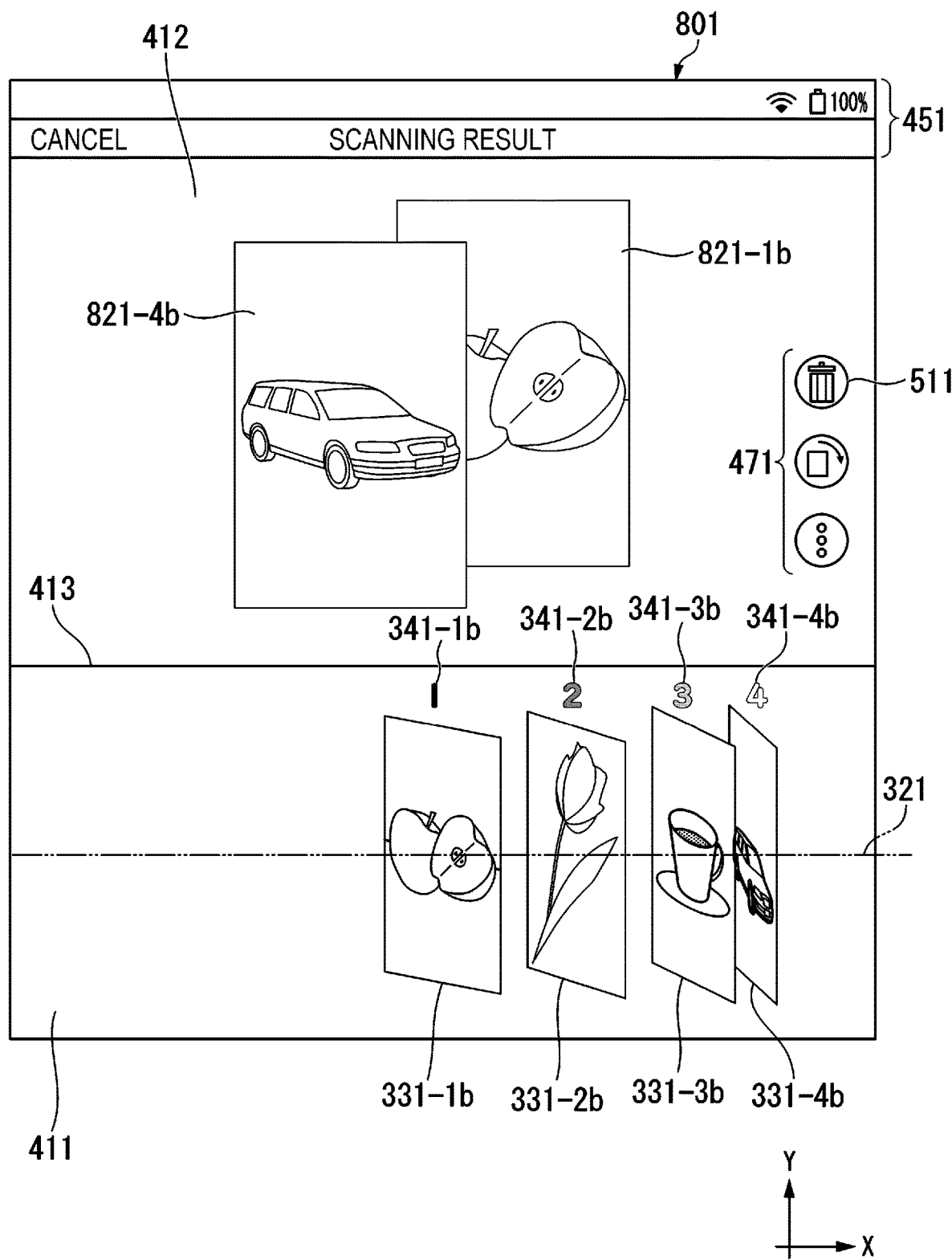
FIG. 8 is a diagram schematically illustrating an image of a second animation on a third display screen.

FIG. 8 is a diagram schematically illustrating an image of a second animation on a third display screen 801 according to the embodiment.

FIG. 8 illustrates the same display coordinate system as that illustrated in FIG. 4.

In FIG. 8, a plurality of 1b-th and subsequent thumbnail images 331-1*b* and the like and a plurality of 1b-th and subsequent page number images 341-1*b* and the like are displayed in the first display region 411. Page number images that are not related to pages are referred to as page number images 341. Intermediate images that are not related to pages are referred to as intermediate images 821.

In the display of the second animation, the display controller 131 controls the display in the second display region 412 to gradually reduce an xb-th intermediate image 821-*xb* in size, increase the transparency of the xb-th intermediate image 821-*xb*, make the xb-th intermediate image 821-*xb* disappear from the positive side of the Y axis to the negative side of the Y axis, gradually enlarge a yb-th intermediate image 821-*yb*, reduce the transparency of the yb-th intermediate image 821-*yb*, and make the yb-th intermediate image 821-*yb* appear from the negative side of the Y axis toward the positive side of the Y axis. The user visually recognizes that the 1b-th intermediate image 821-1*b* is reduced in size and falls while the transparency of the 1b-th intermediate image 821-1*b* is increased and that the 4b-th intermediate image 821-4*b* is enlarged and rises while the transparency of the 4b-th intermediate image 821-4*b* is reduced.

FIG. 8 illustrates the states of the images in the middle of the second animation displayed in the second display region 412.

The second animation is a cross-fade animation.

An increase in transparency corresponds to a decrease in a gray level. A decrease in transparency corresponds to an increase in a gray level.

The second amination may be used when a thumbnail image that is not adjacent to an 1b-th thumbnail image 331-1*b* selected from among the plurality of thumbnail images 331 displayed in the first display region 411 is selected. A page movement in this case may be referred to as long jump.

It is assumed that a 4b-th thumbnail image 331-4*b* that is not adjacent to the 1b-th thumbnail image 331-1*b* is selected by a user's finger or the like in a state in which the 1b-th thumbnail image 331-1*b* is selected. The display controller 131 controls the display to make the 1b-th intermediate image 821-1*b* corresponding to the selected 1b-th thumbnail image 331-1*b* disappear from the positive side of the Y axis to the negative side of the Y axis while gradually reducing the 1b-th intermediate image 331-1*b* in size and increasing the transparency of the 1b-th intermediate image 331-1*b*, and to make the 4b-th intermediate image 821-4*b* corresponding to the newly selected 4b-th thumbnail image 331-4*b* appear from the negative side of the Y axis toward the positive side of the Y axis while gradually enlarging the 4b-th intermediate image 821-4*b* and reducing the transparency of the 4b-th intermediate image 821-4*b*.

As an animation executed when page replacement with an adjacent page occurs as illustrated in FIG. 5, the display controller 131 may use an animation obtained by reducing the speed of the second animation illustrated in FIG. 8 or an animation obtained by increasing the speed of the second animation illustrated in FIG. 8.

As an animation executed when page replacement with an adjacent page occurs as illustrated in FIG. 5, the display controller 131 may use an animation obtained by making the first animation illustrated in FIG. 8 blink.

As an animation executed when page replacement with an adjacent page occurs as illustrated in FIG. 5, the display controller 131 may use an animation obtained by changing the speed of the second animation and making the second animation blink.

The display controller 131 treats a page adjacent to an original page as a newly selected page and performs display according to the second animation.

The display controller 131 updates the plurality of thumbnail images 331 to the thumbnail images 331 displayed in the order after the replacement in the first display region 411.

When page replacement with a page excluding an adjacent page occurs as illustrated in FIG. 6, the display controller 131 may use, as an animation executed when a page adjacent to a concerned page on the side on which the page excluding the adjacent page is present is in a newly selected state, an animation obtained by either or both of changing the speed of the second animation and making the second animation blink. The display controller 131 treats a page adjacent to an original page as a newly selected page and performs display according to the second animation.

When page replacement with a page excluding an adjacent page occurs as illustrated in FIG. 6, the display controller 131 may use the following animation as an animation executed when a page selected in advance is in a selected state. In the animation, an intermediate image 431 corresponding to a thumbnail image 331 between the position of a thumbnail image 331 of the page selected in advance before a movement of the thumbnail image 331 and the position of the thumbnail image 331 after the movement of the thumbnail image 331 is gradually reduced in size, the transparency of the intermediate image 431 is increased, the intermediate image 431 disappears from the positive side of the Y axis to the negative side of the Y axis, an intermediate image 431 corresponding to the thumbnail image 331 selected in advance is gradually enlarged, the transparency of the intermediate image 431 is reduced, and the intermediate image 431 appears from the negative side of the Y axis toward the positive side of the Y axis. Intermediate images that are not related to pages are referred to as intermediate images 431.

The display controller 131 updates the plurality of thumbnail images 331 to the thumbnail images 331 displayed in the order after the replacement in the first display region 411.

When the display controller 131 receives an instruction to replace a page of a thumbnail image 331 in a state in which the thumbnail image 331 that is not a thumbnail image 331 selected in the first display region 411 is selected by a user's finger or the like, the display controller 131 may use an animation obtained by either or both of changing the speed of the second animation and making the second animation blink. The animation may be obtained by reducing the speed of the second animation to be used upon long jump.

Figure 9:
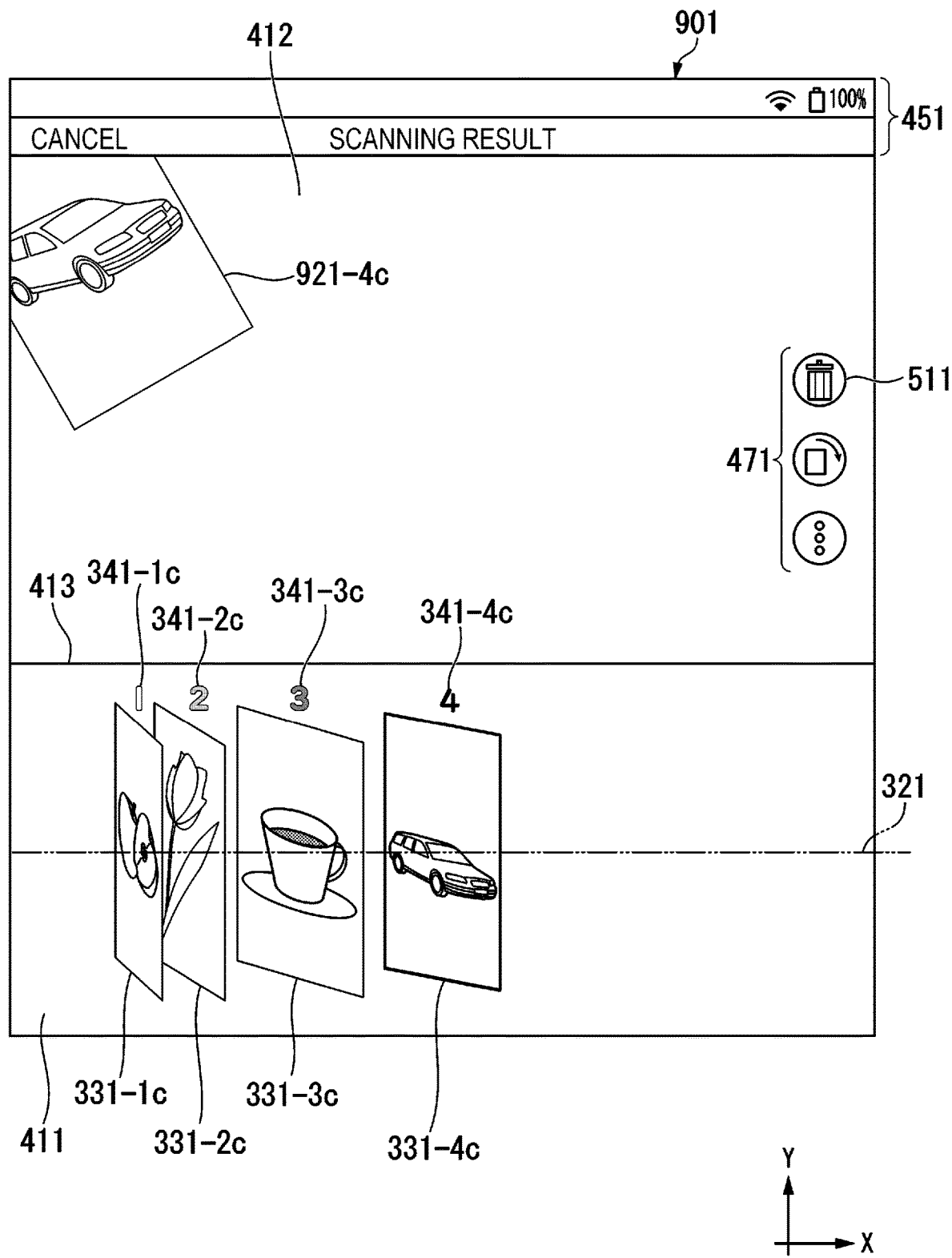
FIG. 9 is a diagram schematically illustrating an image of a third animation on a fourth display screen.

FIG. 9 is a diagram schematically illustrating an image of a third animation on a fourth display screen 901 according to the embodiment.

FIG. 9 illustrates the same display coordinate system as that illustrated in FIG. 4 for convenience of explanation.

In an example illustrated in FIG. 9, a plurality of 1c-th and subsequent thumbnail images 331-1c and the like and a plurality of 1c-th and subsequent page number images 341-1c and the like are displayed in the first display region 411.

In the display of the third animation, the display controller 131 controls the display in the second display region 412 in such a manner that an intermediate image 921 disappears toward the outside of the second display region 412. An intermediate image that is not related to a page is referred to as intermediate image 921.

FIG. 9 illustrates the states of the images in the middle of the third animation displayed in the second display region 412.

The third animation is used when an instruction to delete a thumbnail image 331 selected from among the plurality of thumbnail images 331 displayed in the first display region 411 is received.

It is assumed that an operation of deleting a 4c-th thumbnail image 331-4c selected is performed by a user's finger or the like. The display controller 131 controls the display to gradually increase the transparency of a 4c-th intermediate image 921-4c corresponding to the selected 4c-th thumbnail image 331-4c and make the 4c-th intermediate image 921-4c disappear to the positive side of the Y axis while rotating the 4c-th intermediate image 921-4c. The user visually recognizes that the 4c-th intermediate image 921-4c displayed in the second display region 412 disappears to the upper left side of the screen or the like while rotating.

The display controller 131 may control the display of the third animation to slide an intermediate image 921 corresponding to a thumbnail image 331 selected immediately after a deleted 1c-th thumbnail image 331-1c toward the inside of the second display region 412 from the outside of the second display region 412 along the X axis. In this case, the intermediate image 921 is slid from the positive side of the X axis to the negative side of the X axis when a page with a page number larger by 1 than a page of the deleted thumbnail image 331 is newly selected. The intermediate image 921 is slid from the negative side of the X axis to the positive side of the X axis when a page with a page number smaller by 1 than the page of the deleted thumbnail image is newly selected.

When the deletion of a page of an intermediate image 921 displayed in the second display region 412 occurs, the display controller 131 displays an intermediate image 921 corresponding to the next page after the concerned page in the second display region 412 as a state in which the next page after the concerned page is selected. The display controller 131 causes a thumbnail image 331 of the next page after the concerned page to be in a selected state in the first display region 411.

When the last one of a plurality of pages is deleted, the display controller 131 displays an intermediate image 921 corresponding to a page immediately before the last page in the second display region 412 as a state in which the page immediately before the last page is selected. The display controller 131 causes a thumbnail image 331 corresponding to the page immediately before the last page to be in a selected state in the first display region 411.

When thumbnail images 331 of five pages and intermediate images 921 corresponding to the thumbnail images 331 are present in total and the third page is deleted, the display controller 131 causes the fourth page to be in a selected state.

When thumbnail images 331 of five pages and intermediate images 921 corresponding to the thumbnail images 331 are present in total and the fifth page is deleted, the sixth and subsequent pages are not present and thus the display controller 131 causes the fourth page to be in a selected state.

When the last page is deleted, the display controller 131 causes a page immediately before the last page to be in a newly selected state.

As an operation of deleting a page by the user, an arbitrary operation may be used.

As an operation of deleting a page, an operation of tapping the delete icon 511 by a user's finger or the like in a state in which a thumbnail image 331 of the page to be deleted is selected is used.

When an operation of deleting a page occurs, the display controller 131 may display a message that prompts the user to check whether the page is to be deleted. In response to a user's operation of providing an instruction to delete the page, the display controller 131 deletes the page.

As described with reference to FIG. 9, when the terminal device 12 receives an instruction to delete one of the thumbnail images 331, the terminal device 12 performs display in a display form different from that used when an instruction to move a page is given.

As described above, the terminal device 12 included in the information processing system 1 according to the embodiment performs display in display forms different for multiple operations performed based on user operations. Therefore, the terminal device 12 can feed back and present, in a display form, a page operation instructed by the user.

In the embodiment, the terminal device 12 uses an animation as the display form.

Therefore, the terminal device 12 can use an animation to notify the user of what kind of operation has been performed. When the user views an animation different from an animation to be displayed upon an operation performed in response to an operation performed by the user, the user can notice that the user has performed the operation erroneously.

In the embodiment, when page replacement is executed to move a thumbnail image 331 selected from among the plurality of thumbnail images 331 displayed along the first axis 321 that is a virtual axis, the terminal device 12 displays, as a display form, an animation that varies depending on the position of a destination to which the selected thumbnail image 331 is moved.

Therefore, when the thumbnail image 331 selected from among the plurality of thumbnail images 331 is moved to the position of another thumbnail image 331 among the plurality of thumbnail images 331, the terminal device 12 displays, as a display form, an animation that varies depending on a category of the position of the destination to which the selected thumbnail image 331 is moved and thus the user can intuitively recognize the position of the movement destination.

As the category of the position of the movement destination, a category that indicates whether the position of the movement destination is adjacent to the position of the image before the movement may be used.

When a page movement is performed in such a manner that a thumbnail image 331 that is different from a thumbnail image 331 selected from among the plurality of thumbnail images 331 displayed along the first axis 321 that is a virtual axis is selected, the terminal device 12 displays, as a display form, an animation that varies depending on a positional relationship between a page previously selected and a page selected after that.

Therefore, when a thumbnail image 331 different from a thumbnail image 331 selected from among the plurality of thumbnail images 331 is selected, the terminal device 12 displays, as a display form, an animation that varies depending on a category of a positional relationship between the thumbnail images 331 and the user can intuitively recognize the position of a movement destination of the page.

As the category of the positional relationship, a category indicating whether the image is moved to the position of an image adjacent to the concerned image may be used.

When the user moves pages page by page by tapping the plurality of thumbnail images 331 in ascending or descending order of page number and views an animation corresponding to long jump, the user can notice that the user has erroneously performed an operation of moving two or more pages.

The terminal device 12 displays a specific animation for an operation of deleting a page, thereby feeding back and presenting, to the user, information indicating that the operation of deleting the page has been performed.

When the user provides an instruction to perform page replacement or the like by tapping a thumbnail image 331 or the like, and any animation is not displayed or the same animation is displayed, regardless of whether a destination of a page to be replaced or the like is an adjacent page or a far page excluding the adjacent page, it may be difficult for the user to notice an erroneous operation.

In an operation of checking a scanning result using the first display region 411, when a certain thumbnail image 331 of a selected page is arranged near the center of the first display region 411 in the X-axis direction, and the user taps another thumbnail image 331 present on the positive or negative side of the X axis with respect to the certain thumbnail image 331, the tapped thumbnail image 331 is moved to a position near the center of the first display region 411 in the X-axis direction, and an intermediate image 431 corresponding to the moved thumbnail image 331 is displayed in the second display region 412. The user can move pages page by page by continuously tapping a thumbnail image 331 adjacent to a thumbnail image 331 displayed near the center of the first display region 411 in the X-axis direction.

However, a thumbnail image 331 of a page adjacent to a page of a thumbnail image 331 present near the center of the first display region 411 in the X-axis direction may not be arranged at the same position, depending on a displayed state of the thumbnail images 331 displayed in the first display region 411. When a width of the displayed thumbnail image 331 of the adjacent page is smaller than a width of the thumbnail image 331 facing the display screen, the user may erroneously tap a thumbnail image 331 of a page adjacent to the concerned adjacent page without tapping the thumbnail image 331 of the concerned adjacent page.

The terminal device 12 can feed back and present a page operation to the user, thereby notifying the user of an erroneous operation.

When a thumbnail image 331 is tapped or the like to move a certain page, and the certain page is moved to an adjacent page, the terminal device 12 displays the same animation as that displayed when an intermediate image is swiped. When the certain page is moved to a page that is farther from the certain page than the adjacent page is, the terminal device 12 displays a different animation.

Therefore, when the user taps thumbnail images 331 and checks pages page by page to check a scanning result, and views a page after skipping two pages or the like, the terminal device 12 can display another type of animation, thereby notifying the user of the erroneous operation.

When an operation of deleting a page is performed, the terminal device 12 displays an animation indicating a special operation such as an operation of moving an intermediate image upward while rotating the intermediate image. After that, the terminal device 12 slides a newly selected intermediate image 921 from the side to the second display region 412. When a page excluding the last page is deleted, the terminal device 12 slides an intermediate image 921 of the next page after the deleted page from the side. Only when the last page is deleted, the terminal device 12 slides an intermediate image 921 of a page immediately before the last page from the side.

Therefore, when an operation of deleting a page is performed, the terminal device 12 makes it possible for the user to visually recognize that a special operation has been performed.

When a page replacement operation is performed and a page currently displayed as an intermediate image is replaced, the terminal device 12 keeps the display of the intermediate image. On the other hand, when a page different from the page currently displayed as the intermediate image is replaced, the terminal device 12 newly displays an intermediate image 921 of the replaced page using an animation that is similar to an animation used upon long jump for moving a page to a far page and is slower than the animation used upon the long jump.

Therefore, the terminal device 12 can make it easier for the user to notice that the user has performed an operation of moving a page different from a selected page to replace the page.

Although the embodiment describes the scanner function of the image processing device 11, the image processing device 11 may have another function. The image processing device 11 may have a printing function. The terminal device 12 controls printing to be performed by the image processing device 11, receives data on an image to be printed, and displays the data on the image on the display section 112.

The image processing device 11 may have a plurality of functions including the scanner function and the printing function and may be a multifunction machine.

The embodiment describes the case where the terminal device 12 is a mobile terminal device. However, the terminal device 12 may be a stationary device or any of various devices that are displays or the like and have a screen.

The terminal device 12 may be referred to as viewer.

The image processing device 11 may be a server device that provides image data stored in a database or the like to the terminal device 12.

The image data may be electronic book data.

As the display region of the display section 112 of the terminal device 12, a single display region may be used, or two display regions such as the first display region 411 and the second display region 412 may be used separately, or three or more display regions may be used separately.

When a plurality of display regions are used in the terminal device 12, the arrangement of the display regions is arbitrary. When the terminal device 12 is viewed from the front side, the plurality of image regions may be arranged on the left and right sides or may be arranged on the upper and lower sides. Alternatively, the plurality of image regions may be arranged in a different manner from the foregoing arrangements.

In the terminal device 12, the first display region 411 and the second display region 412 may be arranged in reverse order.

Although the case where the terminal device 12 displays one intermediate image 431 in the second display region 412 is described above, the terminal device 12 may display two or more intermediate images 431 in the second display region 412.

Although the case where the display controller 131 of the terminal device 12 controls the various types of display is described above, the image processing device 11 may perform the same display control as that by the display controller 131. The image processing device 11 performs display on a control panel included in the image processing device 11 and configured to perform display, an external display, a remote display, or the like.

Although the case where the display controller 131 generates the display data using the local coordinate systems, the global coordinate system, and the display coordinate system is described above, the embodiment is not limited to this and the display controller 131 may generate the display data using an arbitrary method.

Examples of the configurations according to the embodiment are described below.

The terminal device 12 included in the information processing system 1 according to the embodiment performs the following image display method.

The image display method is performed by the terminal device 12 that includes the display section 112 having the input section 111 that receives touch input. The image display method includes displaying a plurality of images including a first image, a second image adjacent to the first image, and a third image adjacent to the second image along a predetermined axis, receiving selection of the first image based on the touch input, performing, when a first movement instruction to move the first image to a gap between the second image and the third image is received, display in a first display form indicating that the first image has been moved to the gap between the second image and the third image, and performing, when a second movement instruction to move the first image to a position different from the gap between the second image and the third image is received, display in a second display form different from the first display form.

In FIGS. 5 and 6, the seventh thumbnail image 331-7, the eighth thumbnail image 331-8, and the ninth thumbnail image 331-9 are examples of the first image, the second image, and the third image, respectively.

In the embodiment, the animation display forms that are different from each other are examples of the first and second display forms that are different from each other.

The image display method may further include displaying the plurality of images in the first display region 411 of the screen of the terminal device 12 and displaying an enlarged image larger than the plurality of images in the second display region 412.

In FIG. 4, the plurality of thumbnail images 331 displayed in the first display region 411 are an example of the plurality of images. Each of the intermediate images 431 displayed in the second display region 412 is an example of the enlarged image.

As the display form of the plurality of images and the display form of the enlarged image, another form may be used.

The enlarged image may not be displayed.

In the image display method, the enlarged image may be an image corresponding to the first image, and the display in the first form and the second form may be performed on the enlarged image when the selection of the first image is received in a state in which the enlarged image is displayed in the second display region 412.

In FIGS. 7 and 8, the display of the animations using the intermediate images 431 and 821 displayed in the second display region 412 is performed.

The display in either one or both of the first and second display forms may be performed using an image excluding the enlarged image.

In the image display method, the plurality of images may be displayed in such a manner that some of the plurality of images overlap in a partial region of the first display region 411.

In FIG. 4, the third thumbnail image 331-3 and the fourth thumbnail image 331-4 are displayed and overlap in the first display region 411.

The plurality of images may be displayed without overlapping each other.

In the image display method, the display in the second display form may be animation display.

In FIGS. 7 and 8, as the display in the second display form, the animation display is used.

The display in the first display form may be animation display.

The display in the first and second display forms may be display excluding animation display.

The image display method may further include performing display in a third display form different from the first and second display forms when an instruction to delete one of the images is received.

In FIG. 9, as the third display form, the animation display with the intermediate image 921 to be deleted in accordance with the received deletion instruction is used in the second display region 412.

As the display form to be used when an instruction to delete an image is received, another display form may be used.

An image display device corresponding to the image display method may be provided.

The image display device includes the display section 112 having the input section 111 that receives touch input, and the display controller 131 that controls display of the display section 112. The display controller 131 displays a plurality of images including a first image, a second image adjacent to the first image, and a third image adjacent to the second image along a predetermined axis. The input section 111 receives selection of the first image based on the touch input. When a first movement instruction to move the first image to a gap between the second image and the third image is received, the display controller 131 performs display in a first display form indicating that the first image has been moved to the gap between the second image and the third image. When a second movement instruction to move the first image to a position different from the gap between the second image and the third image is received, the display controller 131 performs display in a second display form different from the first display form.

In FIG. 2, the terminal device 12 is an example of the image display device. The terminal device 12 includes the display section 112, the input section 111, and the display controller 131.

A display control program corresponding to the image display method may be provided.

A non-transitory computer-readable storage medium stores the display control program to be executed by a computer that controls display of the terminal device 12 that includes the display section 112 having the input section 111 that receives touch input. The display control program includes displaying a plurality of images including a first image, a second image adjacent to the first image, and a third image adjacent to the second image along a predetermined axis, receiving selection of the first image based on the touch input, performing, when a first movement instruction to move the first image to a gap between the second image and the third image is received, display in a first display form indicating that the first image has been moved to the gap between the second image and the third image, and performing, when a second movement instruction to move the first image to a position different from the gap between the second image and the third image is received, display in a second display form different from the first display form.

In FIG. 2, a computer that constitutes the terminal device 12 executes the display control program.

The display control program that achieves a function of an arbitrary constituent section included in arbitrary devices such as the terminal device 12 described above and the image processing device 11 described above may be stored in a computer-readable storage medium, read into a computer system, and executed by the computer system. The "computer system" includes an operating system or hardware such as a peripheral device. The "computer-readable storage medium" is a portable medium such as a flexible disk, a magneto-optical disc, a ROM, or a compact disc-ROM (CD-ROM), or a storage device such as a hard disk included in the computer system. The "computer-readable storage medium" includes a volatile memory or the like that stores the program for a fixed time period and is included in a computer system serving as a server or a client when the program is transmitted via a network such as the Internet or a communication line such as a phone line. The volatile memory may be a RAM. The storage medium may be a non-transitory storage medium.

The foregoing program may be transmitted from the computer system storing the program in the storage device or the like to another computer system via a transmission medium or by a transmission wave in the transmission medium. The "transmission medium" that transmits the program is a medium that has a function of transmitting information, like a network such as the Internet or a communication line such as a phone line.

The foregoing program may achieve some of the foregoing functions. A combination of the foregoing program and a program already stored in the computer system may achieve the foregoing functions. The foregoing program may be a differential file. The differential file may be referred to as differential program.

A function of an arbitrary constituent section included in arbitrary devices such as the terminal device 12 described above and the image processing device 11 described above may be achieved by a processor. The processes according to the embodiment may be achieved by the processor that operates based on information of the program or the like and a computer-readable storage medium storing information of the program or the like. Functions of sections of the processor may be achieved by individual hardware or by hardware with the integrated functions of the sections. The processor may include hardware, and the hardware may include at least one of a circuit that processes a digital signal and a circuit that processes an analog signal. The processor may be constituted using one or multiple circuit devices mounted on a circuit board or using one or multiple circuit elements. As the circuit devices, integrated circuits (ICs) or the like may be used. As the circuit elements, a resistor, a capacitor, and the like may be used.

The processor may be a CPU, but is not limited to the CPU. As the processor, any of various processors such as a graphics processing unit (GPU) and a digital signal processor (DSP) may be used. The processor may be a hardware circuit constituted by an ASIC. The processor may be constituted by a plurality of CPUs or may be constituted by a hardware circuit constituted by a plurality of ASICs. The processor may be constituted by a combination of a plurality of CPUs and a hardware circuit constituted by a plurality of ASICs. The processor may include one or more of an amplifying circuit that processes an analog signal, a filter circuit, and the like.

Although the embodiment is described above with reference to the drawings, the specific configurations are not limited to the embodiment and include design and the like that do not depart from the gist of the present disclosure.

What is claimed is:

1. An image display method for a terminal device that includes a display section having an input section that receives touch input, comprising:
    displaying a plurality of images in a first display region, the plurality of images including a first image, a second image adjacent to the first image, and a third image adjacent to the second image along a predetermined axis on the display section;
    causing the input section to receive selection of the first image based on the touch input, the first image being displayed in a second display region as well as the first display region;
    performing in the second display region, when a first movement instruction to move the first image to a gap between the second image and the third image is received by the input section, display in a first display form indicating that the first image has been moved to the gap between the second image and the third image and performing in the first display region a different display of the movement of the first image to the gap than the display in the second display region when the first movement instruction is received; and
    performing in the second display region, when a second movement instruction to move the first image to a position different from the gap between the second image and the third image is received by the input section, display in a second display form different from the first display form and performing in the first display region a different display of the movement of the first image to the position than the display in the second display region when the second movement instruction is received.

2. The image display method according to claim 1, further comprising:

displaying the plurality of images in the first display region of the display section and displaying an enlarged image larger than the plurality of images in the second display region of the display section.

3. The image display method according to claim 2, wherein
the enlarged image is an image corresponding to the first image, and
when the selection of the first image is received in a state in which the enlarged image is displayed in the second display region, the display in the first display form and the second display form is performed on the enlarged image.

4. The image display method according to claim 2, wherein the plurality of images are displayed in such a manner that some of the plurality of images overlap in a partial region of the first display region.

5. The image display method according to claim 1, wherein the display in the second display form is animation display.

6. The image display method according to claim 1, further comprising:
performing display in a third display form different from the first display form and the second display form when an instruction to delete one of the images is received.

7. An image display comprising:
a display section that has an input section that receives touch input; and
a display controller that controls display of the display section, wherein
the display controller displays a plurality of images in a first display region, the plurality of images including a first image, a second image adjacent to the first image, and a third image adjacent to the second image along a predetermined axis on the display section,
the input section receives selection of the first image based on the touch input, the first image being displayed in a second display region as well as the first display region,
when a first movement instruction to move the first image to a gap between the second image and the third image is received by the input section, the display controller performs in the second display region display in a first display form indicating that the first image has been moved to the gap between the second image and the third image and performs in the first display region a different display of the movement of the first image to the gap than the display in the second display region when the first movement instruction is received, and
when a second movement instruction to move the first image to a position different from the gap between the second image and the third image is received by the input section, the display controller performs in the second display region display in a second display form different from the first display form and performs in the first display region a different display of the movement of the first image to the position than the display in the second display region when the second movement instruction is received.

8. The image display according to claim 7, wherein the display controller displays the plurality of images in the first display region of the display section and displays an enlarged image larger than the plurality of images in the second display region of the display section.

9. The image display according to claim 8, wherein
the enlarged image is an image corresponding to the first image, and
when the input section receives the selection of the first image in a state in which the enlarged image is displayed in the second display region, the display controller performs the display in the first display form and the second display form on the enlarged image.

10. The image display according to claim 8, wherein the display controller displays the plurality of images in such a manner that some of the plurality of images overlap in a partial region of the first display region.

11. The image display according to claim 7, wherein the display in the second display form is animation display.

12. The image display according to claim 7, wherein the display controller performs display in a third display form different from the first display form and the second display form when an instruction to delete one of the images is received by the input section.

13. A non-transitory computer-readable storage medium storing a display control program to be executed by a computer that controls display of a terminal device that includes a display section having an input section that receives touch input, the display control program comprising:
causing the computer to display a plurality of images in a first display region, the plurality of images including a first image, a second image adjacent to the first image, and a third image adjacent to the second image along a predetermined axis on the display section;
causing the computer to receive selection of the first image by the input section based on the touch input, the first image being displayed in a second display region as well as the first display region;
causing the computer to perform in the second display region, when a first movement instruction to move the first image to a gap between the second image and the third image is received by the input section, display in a first display form indicating that the first image has been moved to the gap between the second image and the third image and perform in the first display region a different display of the movement of the first image to the gap than the display in the second display region when the first movement instruction is received; and
causing the computer to perform in the second display region, when a second movement instruction to move the first image to a position different from the gap between the second image and the third image is received by the input section, display in a second display form different from the first display form and perform in the first display region a different display of the movement of the first image to the position than the display in the second display region when the second movement instruction is received.

14. The non-transitory computer-readable storage medium according to claim 13, the display control program further comprising:
causing the computer to display the plurality of images in the first display region of the display section and display an enlarged image larger than the plurality of images in the second display region of the display section.

15. The non-transitory computer-readable storage medium according to claim 14, wherein
the enlarged image is an image corresponding to the first image, and
the display in the first display form and the second display form is performed on the enlarged image when the selection of the first image is received by the input section in a state in which the enlarged image is displayed in the second display region.

16. The non-transitory computer-readable storage medium according to claim 14, wherein
the plurality of images are displayed in such a manner that some of the plurality of images overlap in a partial region of the first display region.

17. The non-transitory computer-readable storage medium according to claim 13, wherein
the display in the second display form is animation display.

18. The non-transitory computer-readable storage medium according to claim 13, the display control program further comprising:
causing the computer to perform display in a third display form different from the first display form and the second display form when an instruction to delete one of the images is received by the input section.

* * * * *